United States Patent
Sugii et al.

(10) Patent No.: US 11,945,055 B2
(45) Date of Patent: Apr. 2, 2024

(54) FLUX AND SOLDER PASTE

(71) Applicant: SENJU METAL INDUSTRY CO., LTD., Tokyo (JP)

(72) Inventors: Hiroshi Sugii, Tokyo (JP); Yasuhiro Kajikawa, Tokyo (JP); Yo Yamada, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 18/034,972

(22) PCT Filed: Oct. 14, 2021

(86) PCT No.: PCT/JP2021/038088
§ 371 (c)(1),
(2) Date: May 2, 2023

(87) PCT Pub. No.: WO2022/113556
PCT Pub. Date: Jun. 2, 2022

(65) Prior Publication Data
US 2023/0302585 A1  Sep. 28, 2023

(30) Foreign Application Priority Data
Nov. 30, 2020  (JP) ................. 2020-198369

(51) Int. Cl.
*B23K 35/36*  (2006.01)
*B23K 35/26*  (2006.01)

(52) U.S. Cl.
CPC ........ *B23K 35/3612* (2013.01); *B23K 35/262* (2013.01)

(58) Field of Classification Search
CPC ................................. B23K 35/3612
See application file for complete search history.

(56) References Cited

U.S. PATENT DOCUMENTS

| | | | | |
|---|---|---|---|---|
| 3,660,127 A | * | 5/1972 | Aronberg ........... | B23K 35/3611 148/26 |
| 4,151,015 A | * | 4/1979 | Cooper ............. | B23K 35/3612 148/23 |
| 5,011,546 A | | 4/1991 | Frazier et al. | |
| 5,297,721 A | * | 3/1994 | Schneider .......... | B23K 35/3616 228/180.1 |
| 2004/0069376 A1 | | 4/2004 | Saikawa et al. | |

FOREIGN PATENT DOCUMENTS

| | | |
|---|---|---|
| CN | 101596656 A | 12/2009 |
| CN | 104070308 A | 10/2014 |
| CN | 105855518 A | 8/2016 |
| CN | 106078091 A | 11/2016 |
| JP | S60-127096 A | 7/1985 |
| JP | H07-136794 A | 5/1995 |
| WO | 02/38328 A1 | 5/2002 |

OTHER PUBLICATIONS

International Search Report of the International Searching Authority issued by the Japan Patent Office for corresponding International Patent Application No. PCT/JP2021/038088, dated Jan. 11, 2022, with a partial English translation.
Notice of Reasons for Refusal issued by the Japan Patent Office for corresponding Japanese Patent Application No. 2020-198369, dated Mar. 9, 2021, with an English translation.
Decision to Grant a Patent issued by the Japan Patent Office for corresponding Japanese Patent Application No. 2020-198369, dated Jul. 20, 2021, with an English translation.

* cited by examiner

*Primary Examiner* — Alexandra M Moore
(74) *Attorney, Agent, or Firm* — Myers Wolin, LLC

(57) ABSTRACT

A flux containing 1 to 10 wt % of an organic sulfonic acid activator, 10 to 40 wt % of a high-molecular-weight nonionic surfactant that is a nonionic surfactant having a mass-average molecular weight Mw of more than 1200 and 5 to 75 wt % of a low-molecular-weight nonionic surfactant that is a nonionic surfactant having a mass-average molecular weight Mw of 1200 or less, in which the content of the low-molecular-weight nonionic surfactant is equal to or larger than the content of the organic sulfonic acid activator. This flux contains no cationic surfactant or contains more than 0 wt % and 5 wt % or less of the cationic surfactant. A solder paste containing this flux and a Sn-based solder metal.

6 Claims, No Drawings

FLUX AND SOLDER PASTE

CROSS-REFERENCE TO RELATED APPLICATION

This application is a National Stage application under 35 U.S.C. 371 of International Application No. PCT/JP2021/038088, filed on Oct. 14, 2021 and designated the U.S., which claims priority to Japanese Patent Application No. 2020-198369, filed on Nov. 30, 2020. The contents of each are herein incorporated by reference.

FIELD

The present disclosure relates to a flux that is used for soldering and a solder paste using this flux.

BACKGROUND

Ordinarily, a flux is used in soldering. The flux chemically removes metal oxides that are present on the surface of solder and metal oxides present on the metallic surface of a subject of soldering. This makes it possible for metal elements to migrate in the boundary between the solder and the subject and makes both strongly joined together.

Fluxes are classified into resin fluxes, water-soluble fluxes and inorganic fluxes. The resin fluxes are fluxes obtained by adding an activator to a resin such as rosin or a synthetic resin. The water-soluble fluxes are fluxes obtained by dissolving an organic acid activator in a solvent such as water or an organic solvent. In addition to the organic acid activator, polyethylene glycol, a water-soluble base agent or the like is added to the water-soluble fluxes in some cases. The inorganic fluxes are fluxes for which an inorganic material such as hydrochloric acid or zinc chloride is used.

A solder paste is a composite material obtained by mixing the powder of a solder alloy and a flux. Soldering using the solder paste is performed, for example, as described below. First, the solder paste is printed in a soldering portion such as an electrode on a substrate. Subsequently, a component is mounted on the soldering portion. In addition, the substrate is heated in a heating furnace that is called a reflow furnace. This makes the component joined to the soldering portion.

As the related art relating to the present application, techniques by PTLs 1 to 3 are exemplified. PTL 1 discloses a water-soluble flux containing alkanesulfonic acid as an activator. In Example 6 of PTL 1, it is shown that an excellent result was obtained in the wettability test of molten solder for which a water-soluble flux composed of 5 wt % of methanesulfonic acid and 95 wt % of water is used.

PTL 2 discloses a solder paste containing a solder alloy, a non-halogenated amine and an organic portion. A paste No. 27 of PTL 2 shows a sample example containing 0.956 parts by mass of triethanolamine as the non-halogenated amine, 1.00 part by mass of methanesulfonic acid as the organic portion and a solder powder.

In Example 4 of PTL 3, a flux for flux core wire solder containing an activator such as methanesulfonic acid, a surfactant such as cetyl sulfobetaine, octyl benzoate as a brightener and an antioxidant such as diethanolamine is disclosed.

CITATION LIST

Patent Literature

[PTL 1] JP H7-136794 A
[PTL 2] U.S. Pat. No. 5,011,546 B
[PTL 3] CN 104070308 A

SUMMARY

Technical Problem

The methanesulfonic acid that is common in PTLs 1 to 3 is classified as an organic sulfonic acid activator. The activity of organic sulfonic acid activators (that is, oxide film removing capability) is ordinarily higher than that of organic carboxylic acid activators. Therefore, when a flux containing the former is used, it is expected that the wettability of molten solder becomes higher as compared with a flux containing the latter. Therefore, it is conceivable that a flux containing a large content of an organic sulfonic acid activator improves the wettability of molten solder.

However, there are cases where the organic sulfonic acid activator forms a salt with Sn, which is a main component of molten solder, at the time of soldering. The Sn salt is a flux residue and thus can be removed by water washing after soldering. However, when a Sn salt is formed, the solubility in water deteriorates. Therefore, in a case where the content of the organic sulfonic acid activator is large, the washability deteriorates. Therefore, there is a room for improvement from the viewpoint of suppressing the deterioration of the washability without impairing the merit of the wettability attributed to the use of the organic sulfonic acid activator.

In addition, fluxes composed of an organic sulfonic acid activator and a solvent such as water have low thixotropy and thus have a problem in that it is not possible to increase the amount of the flux that is transferred to circuit boards. Therefore, there is another room for improvement from the viewpoint of ensuring transferability.

An objective of the present disclosure is to, in a flux containing an organic sulfonic acid activator, suppress the deterioration of the washability without impairing the merit of the wettability attributed to the organic sulfonic acid activator. Another objective of the present disclosure is to ensure the transferability of the flux containing an organic sulfonic acid activator into circuit boards. Still another objective of the present disclosure is to provide a solder paste in which such a flux is used.

Solution to Problem

The present inventors paid attention to the fact that, when a nonionic surfactant is added to an organic sulfonic acid activator, the transferability of fluxes can be ensured without impairing the merit of the wettability. However, depending on the kind of the nonionic surfactant, improvement in the washability could not be observed. Therefore, as a result of paying attention to the mass-average molecular weights of nonionic surfactants, a possibility of ensuring the transferability and improving the washability at the same time was found by using a combination of two nonionic surfactants having different mass-average molecular weights. Therefore, the present inventors have conducted additional studies regarding the two nonionic surfactants and completed the present disclosure.

A first discussion is a flux having the following characteristics.

The flux contains
1 to 10 wt % of an organic sulfonic acid activator,
10 to 40 wt % of a high-molecular-weight nonionic surfactant that is a nonionic surfactant having a mass-average molecular weight of more than 1200, and 5 to 75 wt % of a low-molecular-weight nonionic surfactant that is a nonionic surfactant having a mass-average molecular weight of 1200 or less, wherein
a content of the low-molecular-weight nonionic surfactant is equal to or larger than a content of the organic sulfonic acid activator, and
the flux contains no cationic surfactant or contains more than 0 wt % and 5 wt % or less of the cationic surfactant.

A second disclosure further has the following characteristics in the first disclosure.

The flux further contains more than 0 wt % and 10 wt % or less of a co-activator.

The co-activator contains at least one of an organic acid, an amine, an organophosphorus compound, an organohalogen compound and an amine hydrohalide.

A third disclosure further has the following characteristic in the second disclosure.

The flux does not contain the amine as the co-activator.

A fourth disclosure further has the following characteristic in any one of the first to third disclosure.

The flux further contains more than 0 wt % and 60 wt % or less of a solvent.

A fifth disclosure is a solder paste having the following characteristic.

The solder paste contains
the flux according to any one of the first to fourth disclosure, and
a Sn-based solder metal.

A sixth disclosure further has the following characteristic in the fifth disclosure.

The Sn-based solder metal has a melting point of 210° C. or lower.

DESCRIPTION OF EMBODIMENT

An embodiment of the present disclosure will be described in detail below. In the present application, "wt %" means "mass %". In addition, wt % of a component that configures a flux is based on the mass of the entire flux. In addition, in a case where a numerical range is expressed using "to", the range is regarded as including numerical values at both ends.

1. FLUX

A flux according to the embodiment contains an organic sulfonic acid activator, a high-molecular-weight nonionic surfactant and a low-molecular-weight nonionic surfactant as essential components. "High-molecular-weight nonionic surfactant" is defined as a nonionic surfactant having a mass-average molecular weight Mw of more than 1200. "Low-molecular-weight nonionic surfactant" is defined as a nonionic surfactant having a mass-average molecular weight Mw of 1200 or less. The mass-average molecular weight Mw is a standard polystyrene-equivalent value based on a measurement value by gel permeation chromatography (GPC) in which tetrahydrofuran (THF) is used as a solvent. Hereinafter, these components and the content of each component (content proportion) will be described in detail.

1-1. Organic Sulfonic Acid Activator

As the organic sulfonic acid activator, an alkanesulfonic acid, an alkanolsulfonic acid and an aromatic sulfonic acid are exemplified. As the alkanesulfonic acid, methanesulfonic acid, ethanesulfonic acid, 1-propanesulfonic acid, 2-propanesulfonic acid, 1-butanesulfonic acid, 2-butanesulfonic acid, pentanesulfonic acid, hexanesulfonic acid, decanesulfonic acid and dodecane sulfonic acid are exemplified. As the alkanolsulfonic acid, 2-hydroxyethane-1-sulfonic acid, 2-hydroxypropane-1-sulfonic acid, 2-hydroxybutane-1-sulfonic acid, 2-hydroxypentane-1-sulfonic acid, 1-hydroxypropane-2-sulfonic acid, 3-hydroxypropane-1-sulfonic acid, 4-hydroxybutane-1-sulfonic acid, 2-hydroxyhexane-1-sulfonic acid, 2-hydroxydecane-1-sulfonic acid and 2-hydroxydodecane-1-sulfonic acid are exemplified. As the aromatic sulfonic acid, 1-naphthalenesulfonic acid, 2-naphthalenesulfonic acid, p-toluenesulfonic acid, xylenesulfonic acid, p-phenolsulfonic acid, cresolsulfonic acid, sulfosalicylic acid, nitrobenzenesulfonic acid, sulfobenzoic acid and diphenylamine-4-sulfonic acid are exemplified.

The content of the organic sulfonic acid activator (in a case where two or more organic sulfonic acid activators are used, the total content thereof) is 1 to 10 wt %. As the content increases, the wettability of molten solder more improves. Therefore, the lower limit value of the content is preferably 2.5 wt %. That is, in a case where improvement in wettability is emphasized, the content is preferably 2.5 to 10 wt %. On the other hand, when the content is too large, the organic sulfonic acid activator is likely to form a salt with Sn that is contained in molten solder, which causes the deterioration of the washability. Therefore, the upper limit value of the content is preferably 5 wt %. That is, in a case where the ensuring of washability is emphasized, the content is preferably 1 to 5 wt %.

1-2. High-Molecular-Weight Nonionic Surfactant

As the high-molecular-weight nonionic surfactant, polyalkylene glycol, an alcohol polyalkylene glycol adduct and a carboxylic acid polyalkylene glycol adduct all having a mass-average molecular weight Mw of more than 1200 are exemplified.

As the polyalkylene glycol, polyethylene glycol (PEG), polypropylene glycol (PPG) and a polyethylene glycol-polypropylene glycol copolymer (PEG-PPG copolymer) are exemplified.

As the alcohol polyalkylene glycol adduct, an alcohol polyalkylene glycol EO adduct obtained by the addition polymerization of ethylene oxide to alcohol polyalkylene glycol and an alcohol polyalkylene glycol EO/PO adduct obtained by the addition polymerization of ethylene oxide and propylene oxide to alcohol polyalkylene glycol are exemplified. As such an alcohol polyalkylene glycol adduct, a cetyl alcohol EO adduct having 16 carbon atoms, a cetyl alcohol EO/PO adduct, a stearyl alcohol EO adduct having 18 carbon atoms, a stearyl alcohol EO/PO adduct, a behenyl alcohol EO adduct having 22 carbon atoms and a behenyl alcohol EO/PO adduct are exemplified. In addition, a resorcinol EO adduct having 6 carbon atoms and a resorcinol EO/PO adduct are exemplified.

The carboxylic acid polyalkylene glycol adduct has a structure in which polyalkylene glycol is added to aliphatic carboxylic acid or aromatic carboxylic acid. As the carboxylic acid polyalkylene glycol adduct, a carboxylic acid polyalkylene glycol EO adduct and a carboxylic acid polyalkylene glycol EO/PO adduct are exemplified. As such a carboxylic acid polyalkylene glycol adduct, a palmitic acid EO adduct having 16 carbon atoms, a palmitic acid EO/PO adduct, a stearic acid EO adduct having 18 carbon atoms, a stearic acid EO/PO adduct, a behenic acid EO adduct having 22 carbon atoms and a behenic acid EO/PO adduct are exemplified.

The content of the high-molecular-weight nonionic surfactant (in a case where two or more high-molecular-weight nonionic surfactants are used, the total content thereof) is 10 to 40 wt %. The lower limit value of the content may be 20 wt %.

1-3. Low-Molecular-Weight Nonionic Surfactant

As the low-molecular-weight nonionic surfactant, polyalkylene glycol, an alcohol polyalkylene glycol adduct and a carboxylic acid polyalkylene glycol adduct all having a mass-average molecular weight Mw of 200 to 1200 are exemplified. As these compounds, the compounds exemplified as the high-molecular-weight nonionic surfactant are exemplified. Therefore, there are cases where a compound that is used as the low-molecular-weight nonionic surfactant is common with a compound that is used as the high-molecular-weight nonionic surfactant in a repetitive structure. The lower limit of the mass-average molecular weight Mw may be 300 or 400.

The content of the low-molecular-weight nonionic surfactant (in a case where two or more low-molecular-weight nonionic surfactants are used, the total content thereof) is 5 to 75 wt %. The upper limit value of the content may be 55 wt %. As is clear from the result of Comparative Example 1 to be described below, in a case where the content of the low-molecular-weight nonionic surfactant is smaller than that of the organic sulfonic acid activator, the merit attributed to the addition of the surfactant is less likely to be exhibited. Therefore, the content of the low-molecular-weight nonionic surfactant is preferably equal to or larger than that of the organic sulfonic acid activator.

1-4. Cationic Surfactant

The flux according to the embodiment may contain a cationic surfactant. That is, the flux according to the embodiment contains a cationic surfactant as an optional component. As the cationic surfactant, an organic amine alkylene oxide (AO)-type cationic surfactant and a polyoxyalkyleneamine-type cationic surfactant are exemplified.

The organic amine AO-type surfactant has a structure in which at least one AO selected from ethylene oxide (EO), propylene oxide (PO) and butylene oxide (BO) is added to an organic amine such as an aliphatic amine (aliphatic monoamine or polyamine (aliphatic diamine or aliphatic triamine)) or an aromatic amine (aromatic monoamine or polyamine (aromatic diamine or aromatic triamine)).

The polyoxyalkyleneamine-type surfactant has a repeating unit of an oxyalkylene block such as an oxyethylene block or an oxypropylene block in the molecule and has a structure in which amino groups bond to carbon atoms at the terminals. The polyoxyalkyleneamine-type surfactant is classified into a monoamine type, a diamine type and a triamine type depending on the total number of terminal amino groups.

The content of the cationic surfactant (in a case where two or more cationic surfactants are used, the total content thereof) is larger than 0 wt % and 5 wt % or less. As is clear from the result of Comparative Example 1 to be described below, in a case where the content of the cationic surfactant becomes larger than 5 wt %, the merit attributed to the addition of the low-molecular-weight nonionic surfactant may be offset. In addition, when the content of the cationic surfactant becomes larger than 5 wt %, the merit attributed to the addition of the organic sulfonic acid activator may also be offset. For such reasons, the upper limit value (5 wt %) of the content of the cationic surfactant is set.

1-5. Co-Activator

The flux according to the embodiment may contain a co-activator. That is, the flux according to the embodiment contains a co-activator as an optional component. The co-activator is an additive that aids the reduction of an oxide by the organic sulfonic acid activator. As the co-activator, a different organic acid other than the organic sulfonic acid activator, an amine, an organophosphorus compound, an organohalogen compound and an amine hydrohalide are exemplified. Two or more of these co-activators may be used at the same time.

The content of the co-activator (in a case where two or more co-activators are used, the total content thereof) is larger than 0 wt % and 10 wt % or less. The upper limit value of the content may be 6 wt % or 5 wt %. The content of the co-activator may be equal to or larger than the content of the organic sulfonic acid activator or may be set to be smaller than the content of the organic sulfonic acid activator.

1-5-1. Other Organic Acid

As the other organic acid, glutaric acid, adipic acid, azelaic acid, eicosanedioic acid, citric acid, glycolic acid, lactic acid, succinic acid, salicylic acid, diglycolic acid, dipicolinic acid, dibutylaniline diglycolic acid, suberic acid, sebacic acid, thioglycolic acid, phthalic acid, isophthalic acid, terephthalic acid, dodecanedioic acid, parahydroxyphenylacetic acid, picolinic acid, phenylsuccinic acid, fumaric acid, maleic acid, malonic acid, lauric acid, benzoic acid, tartaric acid, tris(2-carboxyethyl) isocyanurate, glycine, 1,3-cyclohexanedicarboxylic acid, 2,2-bis(hydroxymethyl)propionic acid, 2,2-bis(hydroxymethyl)butanoic acid, 4-tert-butylbenzoic acid, 2,3-dihydroxybenzoic acid, 2,4-diethylglutaric acid, 2-quinolinecarboxylic acid, 3-hydroxybenzoic acid, malic acid, p-anisic acid, palmitic acid, stearic acid, 12-hydroxystearic acid, oleic acid, linoleic acid and linolenic acid are exemplified. As the other organic acid, in addition, a dimer acid that is a reaction product of oleic acid and linoleic acid, a hydrogenated dimer acid containing hydrogen added to this dimer acid, a trimer acid that is a reaction product of oleic acid and linoleic acid and a hydrogenated trimer acid containing hydrogen added to this trimer acid are exemplified. As the other organic acid, furthermore, a dimer acid other than a reaction product of oleic acid and linoleic acid, a hydrogenated dimer acid containing hydrogen added to this dimer acid, a trimer acid other than a reaction product of oleic acid and linoleic acid and a hydrogenated trimer acid containing hydrogen added to this trimer acid are exemplified. Two or more of these other organic acids may be used at the same time.

1-5-2. Organophosphorus Compound

As the organophosphorus compound, methyl acid phosphate, ethyl acid phosphate, isopropyl acid phosphate, monobutyl acid phosphate, butyl acid phosphate, dibutyl acid phosphate, butoxyethyl acid phosphate, 2-ethylhexyl acid phosphate, bis(2-ethylhexyl) phosphate, monoisodecyl acid phosphate, isodecyl acid phosphate, lauryl acid phosphate, isotridecyl acid phosphate, stearyl acid phosphate, oleyl acid phosphate, beef tallow phosphate, coconut oil phosphate, isostearyl acid phosphate, alkyl acid phosphate, tetracosyl acid phosphate, ethylene glycol acid phosphate, 2-hydroxyethyl methacrylate acid phosphate, dibutyl pyrophosphate acid phosphate, mono-2-ethylhexyl 2-ethylhexylphosphonate and alkyl (alkyl) phosphonate are exemplified. Two or more of these organophosphorus compounds may be used at the same time.

1-5-3. Organohalogen Compound

As the organohalogen compound, organic bromo compounds such as trans-2,3-dibromo-1,4-butenediol, triallyl isocyanurate hexabromide, 1-bromo-2-butanol, 1-bromo-2-propanol, 3-bromo-1-propanol, 3-bromo-1,2-propanediol, 1,4-dibromo-2-butanol, 1,3-dibromo-2-propanol, 2,3-dibromo-1-propanol, 2,3-dibromo-1,4-butanediol, 2,3-dibromo-2-butene-1,4-diol, trans-2,3-dibromo-2-butene-1,4-diol, cis-2,3-dibromo-2-butene-1,4-diol, tetrabromophthalic acid, bromosuccinic acid and 2,2,2-tribromoethanol are exemplified. As the organohalogen compound, in addition, organic chloro compounds such as a chloroalkane, a chlorinated fatty acid ester, chlorendic acid and a chlorendic anhydride are exemplified. As the organohalogen compound, furthermore, a fluorosurfactant, a surfactant having a perfluoroalkyl group and an organic fluoro compound such as polytetrafluoroethylene are exemplified. Two or more of these organohalogen compounds may be used at the same time.

1-5-4. Amine Hydrohalide

The amine hydrohalide is a compound obtained by reacting an amine and a hydrogen halide. As the amine hydrohalide, stearylamine hydrochloride, diethylaniline hydrochloride, diethanolamine hydrochloride, 2-ethylhexylamine hydrobromide, pyridine hydrobromide, isopropylamine hydrobromide, cyclohexylamine hydrobromide, diethylamine hydrobromide, monoethylamine hydrobromide, 1,3-diphenylguanidine hydrobromide, dimethylamine hydrobromide, dimethylamine hydrochloride, rosinamine hydrobromide, 2-ethylhexylamine hydrochloride, isopropylamine hydrochloride, cyclohexylamine hydrochloride, 2-pipecholine hydrobromide, 1,3-diphenylguanidine hydrochloride, dimethylbenzylamine hydrochloride, hydrazinehydrate hydrobromide, dimethylcyclohexylamine hydrochloride, trinonylamine hydrobromide, diethylaniline hydrobromide, 2-diethylaminoethanol hydrobromide, 2-diethylaminoethanol hydrochloride, ammonium chloride, diallylamine hydrochloride, diallylamine hydrobromide, monoethylamine hydrochloride, diethylamine hydrochloride, triethylamine hydrobromide, triethylamine hydrochloride, hydrazine monohydrochloride, hydrazine dihydrochloride, hydrazine monohydrobromide, hydrazine dihydrobromide, pyridine hydrochloride, aniline hydrobromide, butylamine hydrochloride, hexylamine hydrochloride, n-octylamine hydrochloride, dodecylamine hydrochloride, dimethylcyclohexylamine hydrobromide, ethylenediamine dihydrobromide, rosinamine hydrobromide, 2-phenylimidazole hydrobromide, 4-benzylpyridine hydrobromide, L-glutamine hydrochloride, N-methylmorpholine hydrochloride, betaine hydrochloride, 2-pipecholine hydroiodide, cyclohexylamine hydroiodide, 1,3-diphenylguanidine hydrofluoride, diethylamine hydrofluoride, 2-ethylhexylamine hydrofluoride, cyclohexylamine hydrofluoride, ethylamine hydrofluoride, rosinamine hydrofluoride, cyclohexylamine tetrafluoroborate and dicyclohexylamine tetrafluoroborate are exemplified.

1-5-5. Amine

As the amine, monoethanolamine, diphenylguanidine, ditolylguanidine, ethylamine, triethylamine, cyclohexylamine, ethylenediamine, triethylenetetramine, imidazole, 2-methylimidazole, 2-ethylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine isocyanuric acid adduct, 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrrolo[1,2-a]benzimidazole, 1-dodecyl-2-methyl-3-benzylimidazolium chloride, 2-methylimidazoline, 2-phenylimidazoline, 2,4-diamino-6-vinyl-s-triazine, 2,4-diamino-6-vinyl-s-triazine isocyanuric acid adduct, 2,4-diamino-6-methacryloyloxyethyl-s-triazine, epoxy-imidazole adduct, 2-methylbenzimidazole, 2-octylbenzimidazole, 2-pentylbenzimidazole, 2-(1-ethylpentyl)benzimidazole, 2-nonylbenzimidazole, 2-(4-thiazolyl)benzimidazole, benzimidazole, 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3',5'-di-tert-amylphenyl)benzotriazole, 2-(2'-hydroxy-5'-tert-octylphenyl)benzotriazole, 2,2'-methylenebis[6-(2H-benzotriazol-2-yl)-4-tert-octylphenol], 6-(2-benzotriazolyl)-4-tert-octyl-6'-tert-butyl-4'-methyl-2, 2'-methylenebisphenol, 1,2,3-benzotriazole, 1-[N,N-bis(2-ethylhexyl)aminomethyl]benzotriazole, carboxybenzotriazole, 1-[N,N-bis(2-ethylhexyl)aminomethyl] methylbenzotriazole, 2,2'-[[(methyl-1H-benzotriazol-1-yl)methyl]imino]bisethanol, 1-(1',2'-dicarboxyethyl) benzotriazole, 1-(2,3-dicarboxypropyl)benzotriazole, 1-[(2-ethylhexylamino)methyl]benzotriazole, 2,6-bis[(1H-benzotriazol-1-yl)methyl]-4-methylphenol, 5-methylbenzotriazole and 5-phenyltetrazole are exemplified. Two or more of these amines may be used at the same time.

Since the amine has an action of degrading the activity of the organic sulfonic acid activator, in a case where the amine is used as the co-activator in the flux, the merit of the wettability of molten solder attributed to the organic sulfonic acid activator may be impaired. Therefore, the content of the amine is preferably 0 wt %. That is, the flux according to the embodiment preferably contains no amine.

1-6. Solvent

The flux according to the embodiment may contain a solvent. That is, the flux according to the embodiment contains a solvent as an optional component. In order to efficiently cause the reduction actions of the organic sulfonic acid activator and the co-activator, the solvent preferably does not volatilize at lower than 70° C. When the solvent volatilizes, the flux dries, and it becomes difficult for the flux to wet and spread over a soldering portion. Therefore, the boiling point of the solvent is preferably 120° C. or higher. However, the solvent needs to volatilize during heating. Therefore, the boiling point of the solvent is preferably 270° C. or lower.

As the solvent, water, an alcohol solvent, a glycol ether solvent and terpineols are exemplified. As the alcohol solvent, isopropyl alcohol, 1,2-butanediol, isobornyl cyclohexanol, 2,4-diethyl-1,5-pentanediol, 2,2-dimethyl-1,3-propanediol, 2,5-dimethyl-2,5-hexanediol, 2,5-dimethyl-3-hexyne-2,5-diol, 2,3-dimethyl-2,3-butanediol, 1,1,1-tris(hydroxymethyl)ethane, 2-ethyl-2-hydroxymethyl-1,3-propanediol, 2,2'-oxybis(methylene) bis(2-ethyl-1,3-propanediol), 2,2-bis(hydroxymethyl)-1,3-propanediol, 1,2,6-trihydroxyhexane, bis[2,2,2-tris(hydroxymethyl)ethyl] ether, 1-ethynyl-1-cyclohexanol, 1,4-cyclohexanediol, 1,4-cyclohexanedimethanol, erythritol, threitol, guaiacol glycerol ether, 3,6-dimethyl-4-octyne-3,6-diol and 2,4,7,9-tetramethyl-5-decyne-4,7-diol are exemplified. As the glycol ether solvent, hexyl diglycol, diethylene glycol mono-2-ethylhexyl ether, ethylene glycol monophenyl ether, 2-methylpentane-2,4-diol, diethylene glycol monohexyl ether, diethylene glycol dibutyl ether and triethylene glycol monobutyl ether are exemplified. As the solvent, one of the above-described solvents may be used or two or more solvents may be used at the same time.

The content of the solvent (in a case where two or more solvents are used, the total content thereof) is larger than 0 wt % and 60 wt % or less. The upper limit of this content may be 30 wt % or may be 20 wt %.

1-7. Other Additives

The flux according to the embodiment may contain, as other additives, an antioxidant, a defoamer and a colorant. As the antioxidant, a hindered phenolic antioxidant is exemplified. As the defoamer, an acrylic polymer, a vinyl ether polymer, a butadiene polymer and silicone are exemplified. As the other additive, one of the above-described additives may be used or two or more additives may be used at the same time. The content of the other additive (in a case where two or more other additives are used, the total content thereof) is larger than 0 wt % and 5 wt % or less.

2. SOLDER PASTE

A solder paste according to an embodiment contains the above-described flux and a Sn-based solder metal.

As the Sn-based solder metal, pure Sn and a Sn alloy are exemplified. As the Sn alloy, two-component alloys and multi-component alloys including three or more-component alloys are exemplified. As the two-component alloys, a Sn—Sb-based alloy, a Sn—Pb-based alloy, a Sn—Cu-based alloy, a Sn—Ag-based alloy, a Sn—Bi-based alloy and a Sn—In-based alloy are exemplified. As the multicomponent alloys, alloys obtained by adding one or more metals selected from the group consisting of Sb, Bi, In, Cu, Zn, As, Ag, Cd, Fe, Ni, Co, Au, Ge and P to the above-described two-component alloy are exemplified.

Sn-based solder metals are classified into low-temperature solder metals and high-temperature solder metals. The former is defined as Sn-based solder metal having a melting point (solidus temperature or liquidus temperature, which shall be true below) in a low temperature range (specifically, a temperature range of 210° C. or lower). The latter is defined as Sn-based solder metal having a melting point in a high temperature range (specifically, a temperature range higher than 210° C.). Sn—Bi-based alloys or multicomponent alloys obtained by adding Cu, Ag, Sb or Ni to a Sn—Bi-based alloy are examples of the low-temperature solder metals. Sn—Sb-based alloys or Sn—Ag—Cu-based alloys are examples of the high-temperature solder metals.

Here, regarding Ni electrodes that are formed on typical circuit boards, there is a following problem. That is, an oxide film on the surface of a Ni electrode (that is, a Ni oxide film) is difficult to remove in soldering where a solder metal having a melting point in the low temperature range is used. This is because the heating temperature during soldering is low and the active state of a flux is not sufficient.

Regarding this point, the above-described flux contains the organic sulfonic acid activator as an essential component. Therefore, as is clear from examples to be described below, this makes it possible to remove Ni oxide films even in soldering where a low-temperature solder metal is used. As described above, the above-described flux acquires a merit attributed to the organic sulfonic acid activator in the case of being combined with, particularly, a low-temperature solder metal. Therefore, the solder paste according to the embodiment is preferably a combination of a low-temperature solder metal and the above-described flux.

The contents of the Sn-based solder metal and the flux relative to the mass of the entire solder paste are not limited. For example, the content of the Sn-based solder metal is 5 to 95 mass %, and that of the flux is 5 to 95 mass %.

A method for producing the solder paste is not limited, and the solder paste is produced by mixing the raw materials at the same time or in order by any method. In the production of the solder paste, all of the components of the flux and the solder powder need to be mixed in the end. That is, the solder powder may be mixed with all of the components of the flux that have been prepared in advance, or some of the components of the flux may be mixed with the solder powder and then the remaining components of the flux may be further mixed therein. Furthermore, all of the components of the solder paste may be mixed at the same time.

3. EXAMPLES

Hereinafter, the flux and solder paste according to the embodiment will be described in detail based on examples.

Flux compositions of Examples 1 to 29 (EX. 1 to EX. 29) were prepared according to blending proportions shown in Tables 1 to 4 below. In addition, flux compositions of Comparative Examples 1 to 5 (CEX. 1 to CEX. 5) were prepared. The following items (i) to (iv) were evaluated using these flux compositions. The evaluation results are also shown in Tables 1 to 4 below.

(i) Removability of Ni oxide film with flux composition
(ii) Wettability of molten solder with flux composition
(iii) Washability of flux residue
(iv) Transferability of flux composition 3-1. Evaluation of Removability of Ni Oxide Film (1) Validation Method Removability was validated by the following method. First, ultrasonic washing was performed on a Ni-plated copper plate using a hydrocarbon solvent. Subsequently, the Ni-plated copper plate was heated on a hot plate set to 400° C. for one minute. The surface of the heated copper plate turned into pale yellow due to the oxidation of Ni. Subsequently, each flux composition was applied onto the copper plate, installed on the hot plate set to 200° C. and heated for 30 seconds. After that, the copper plate was washed with water, and the surface state was observed.

(2) Determination Standards

O: It was possible to confirm the metallic luster of Ni.
X: It was not possible to confirm the metallic luster of Ni or the surface of the copper plate remained pale yellow.

3-2. Evaluation of Wettability (1) Validation Method

Wettability was validated by a wetting balance method in which a solder checker (SAT-5200) of Rhesca Corporation was used. First, a test piece (Ni-plated copper plate that was 5 mm in width, 30 mm in length and 0.3 mm in thickness) was heated in a constant temperature bath set to 300° C. for one hour. Subsequently, each flux composition was applied up to a position approximately 1 mm from the front end of the test piece. After that, the set temperature of the constant temperature bath was changed, and the test piece was immersed in a solder bath. The set temperature of the constant temperature bath was changed as appropriate depending on the melting point of a solder alloy in the solder bath. For example, the set temperatures were 190° C. in Examples 1 to 25 and Comparative Examples 1 to 5 and were 250° C. in Example 29. As the immersion conditions, the immersion depth was 2 mm, and the immersion time was 10 seconds.

The compositions of the solder alloys are as described below.

Examples 1 to 25 and Comparative Examples 1 to 5: Sn—40Bi—Cu—Ni
Example 26: Sn—1Ag—57Bi
Example 27: Sn—58Bi
Example 28: Sn—58Bi—0.5Sb—0.015Ni
Example 29: Sn—3.0Ag—0.5Cu (2) Determination Standards O: Zero cross was observed.
X: Zero cross was not observed.

3-3. Evaluation of Washability (1) Validation Method

Washability was validated by the following method. First, each flux composition was printed on a pad of a test board. Subsequently, a solder ball was mounted in this printed region, and reflow soldering was performed. Immediately after the reflow soldering, the test board was immersed in ion-exchange water and washed. After that, the confirmation of a flux residue was performed using SEM. The composition of the solder ball is the same as the composition of the solder alloy used in the evaluation of the wettability.

The reflow soldering conditions were prepared as appropriate depending on the composition of the solder ball. For example, in Examples 1 to 25 and Comparative Examples 1 to 5, the temperature was raised from 30° C. up to a peak temperature (190° C.) by 1° C. every second, and, once this peak temperature was reached, heating was performed for 30 seconds. In Example 29, the reflow soldering was performed with the peak temperature as the above-described reflow soldering condition changed to 250° C. The test board was washed by immersing the test board in a beaker filled with ion-exchange water for three minutes using a hot stirrer. The temperature of the ion-exchange water was set to 50° C. ±10° C., and the rotation speed of the stirrer was set to 300 rpm. After that, the printed region was observed.

(2) Determination Standards

O: There was no washing residue of the flux.
X: There was a washing residue of the flux.

3-4. Evaluation of Transferability (1) Validation Method

Transferability was validated by transferring each flux composition to a test board using a pin transfer device. A difference between the board weight before the transfer of the flux composition and the board weight after the transfer was measured. The number of pads on the test board is 1200, and the diameter of the pin in the transfer device is 0.1 mm. Upon the transfer of the flux composition, kneading was performed for five to ten minutes, and adjustment was made so that the film thickness reached 0.1±0.01 mm. The weight difference (transfer weight) was measured nine times for each flux composition, and the average value was calculated.

(2) Determination Standards

O: The average transfer weight was 1 mg or more.
X: The average transfer weight was less than 1 mg or a bridge was generated.

3-5. Comprehensive Evaluation

Comprehensive evaluation was performed based on the evaluation results of the items (i) to (iv). The determination standards are as described below.
O: The results of the items (i) to (iv) were all O.
X: Any one or all of the results of the items (i) to (iv) were X.

TABLE 1

| | Material | CAS No. | EX.1 | EX.2 | EX.3 | EX.4 | EX.5 | EX.6 | EX.7 | EX.8 | EX.9 |
|---|---|---|---|---|---|---|---|---|---|---|---|
| Sulfonic acid activator | Methanesulfonic acid | 75-752 | 5 | 1 | 10 | | 2.5 | 5 | 5 | 5 | 5 |
| | p-Toluenesulfonic acid | 104-15-4 | | | | 5 | 2.5 | | | | |
| High-molecular-weight nonionic surfactant | Polyethylene glycol A Mw: 3364 | 25322-68-3 | 20 | 20 | 20 | 20 | 20 | | | 10 | 10 |
| | Polyethylene glycol B Mw: 1450 | 25322-68-3 | | | | | | 20 | | 5 | |
| | Stearyl alcohol EO 20 mol adduct Mw: 1900 | 9005-00-9 | | | | | | | 20 | | 5 |

TABLE 1-continued

| | Material | CAS No. | EX.1 | EX.2 | EX.3 | EX.4 | EX.5 | EX.6 | EX.7 | EX.8 | EX.9 |
|---|---|---|---|---|---|---|---|---|---|---|---|
| Low-molecular-weight nonionic surfactant | Polyethylene glycol C Mw: 405 | 25322-68-3 | 55 | 55 | 55 | 55 | 55 | 55 | 55 | 55 | 55 |
| | Polyethylene glycol D Mw: 1000 | 25322-68-3 | | | | | | | | | |
| | Stearyl alcohol EO 5 mol adduct Mw: 888 | | | | | | | | | | |
| | Resorcinol EO adduct Mw: 1136 | 70356-25-1 | | | | | | | | | |
| Cationic surfactant | Polyethylene polypropylene bisaminopropyl ether | 65605-36-9 | | | | | | | | | |
| Organic acid activator | Diglycolic acid | 110-99-6 | | | | | | | | | |
| | Succinic acid | 110-15-6 | | | | | | | | | |
| | Azelaic | 123-99-9 | | | | | | | | | |
| Solvent | 1,2-Butanediol | 584-03-2 | 20 | 24 | 15 | 20 | 20 | 20 | 20 | 20 | 30 |
| | HeDG | 112-59-4 | | | | | | | | | |
| Total | | | 100 | 100 | 100 | 100 | 100 | 100 | 100 | 100 | 100 |
| Solder alloy | | | Sn—40Bi—0.5Cu—0.03Ni | Sn—40Bi—0.5Cu—0.03Ni | Sn—40Bi—0.5Cu—0.03Ni | Sn—40Bi—0.5Cu—0.03Ni | Sn—40Bi—0.5Cu—0.03Ni | Sn—40Bi—0.5Cu—0.03Ni | Sn—40Bi—0.5Cu—0.03Ni | Sn—40Bi—0.5Cu—0.03Ni | Sn—40Bi—0.5Cu—0.03Ni |
| (i) Ni oxide film removing capability | | | ○ | ○ | ○ | ○ | ○ | ○ | ○ | ○ | ○ |
| (ii) Wettability | | | ○ | ○ | ○ | ○ | ○ | ○ | ○ | ○ | ○ |
| (iii) Washability | | | ○ | ○ | ○ | ○ | ○ | ○ | ○ | ○ | ○ |
| (iv) Transferability | | | ○ | ○ | ○ | ○ | ○ | ○ | ○ | ○ | ○ |
| Comprehensive evaluation | | | ○ | ○ | ○ | ○ | ○ | ○ | ○ | ○ | ○ |

TABLE 2

| | Material | CAS No. | EX.10 | EX.11 | EX.12 | EX.13 | EX.14 | EX.15 | EX.16 | EX.17 |
|---|---|---|---|---|---|---|---|---|---|---|
| Sulfonic acid activator | Methanesulfonic acid | 75-752 | 5 | 5 | 5 | 5 | 5 | 5 | 5 | 5 |
| | p-Toluenesulfonic acid | 104-15-4 | | | | | | | | |
| High-molecular-weight nonionic surfactant | Polyethylene glycol A Mw: 3364 | 25322-68-3 | 40 | 20 | 20 | 20 | 20 | 25 | 20 | 20 |
| | Polyethylene glycol B Mw: 1450 | 25322-68-3 | | | | | | | | |
| | Stearyl alcohol EO 20 mol adduct Mw: 1900 | 9005-00-9 | | | | | | | | |
| Low-molecular-weight nonionic surfactant | Polyethylene glycol C Mw: 405 | 25322-68-3 | 55 | | | | 25 | 5 | 75 | 55 |
| | Polyethylene glycol D Mw: 1000 | 25322-68-3 | | 55 | | | 10 | | | |
| | Stearyl alcohol EO 5 mol adduct Mw: 888 | | | | 55 | | 10 | | | |
| | Resorcinol EO adduct Mw: 1136 | 70356-25-1 | | | | 55 | 10 | | | |
| Cationic surfactant | Polyethylene polypropylene bisaminopropyl ether | 65605-36-9 | | | | | | 5 | | |
| Organic acid activator | Diglycolic acid | 110-99-6 | | | | | | | | |
| | Succinic acid | 110-15-6 | | | | | | | | |
| | Azelaic | 123-99-9 | | | | | | | | |
| Solvent | 1,2-Butanediol | 584-03-2 | 0 | 20 | 20 | 20 | 20 | 30 | | 20 |
| | HeDG | 112-59-4 | | | | | | 30 | | |
| Total | | | 100 | 100 | 100 | 100 | 100 | 100 | 100 | 100 |
| Solder alloy | | | Sn—40Bi—0.5Cu—0.03Ni | Sn—40Bi—0.5Cu—0.03Ni | Sn—40Bi—0.5Cu—0.03Ni | Sn—40Bi—0.5Cu—0.03Ni | Sn—40Bi—0.5Cu—0.03Ni | Sn—40Bi—0.5Cu—0.03Ni | Sn—40Bi—0.5Cu—0.03Ni | Sn—40Bi—0.5Cu—0.03Ni |
| (i) Ni oxide film removing capability | | | ○ | ○ | ○ | ○ | ○ | ○ | ○ | ○ |
| (ii) Wettability | | | ○ | ○ | ○ | ○ | ○ | ○ | ○ | ○ |
| (iii) Washability | | | ○ | ○ | ○ | ○ | ○ | ○ | ○ | ○ |
| (iv) Transferability | | | ○ | ○ | ○ | ○ | ○ | ○ | ○ | ○ |
| Comprehensive evaluation | | | ○ | ○ | ○ | ○ | ○ | ○ | ○ | ○ |

TABLE 3

| | Material | CAS No. | CEX.1 | CEX.2 | CEX.3 | CEX.4 | CEX.5 | EX.18 | EX.19 | EX.20 | EX.21 |
|---|---|---|---|---|---|---|---|---|---|---|---|
| Sulfonic acid activator | Methanesulfonic acid | 75-752 | 10 | | | 5 | 5 | 5 | 5 | 5 | 5 |
| | p-Toluenesulfonic acid | 104-15-4 | | | | | | | | | |
| High-molecular-weight nonionic surfactant | Polyethylene glycol A Mw: 3364 | 25322-68-3 | 20 | 20 | 20 | 20 | | 20 | 20 | 20 | 20 |
| | Polyethylene glycol B Mw: 1450 | 25322-68-3 | | | | | | | | | |
| | Stearyl alcohol EO 20 mol adduct Mw: 1900 | 9005-00-9 | | | | | | | | | |
| Low-molecular-weight nonionic surfactant | Polyethylene glycol C Mw: 405 | 25322-68-3 | 5 | 55 | 55 | | 55 | 55 | 55 | 55 | 55 |
| | Polyethylene glycol D Mw: 1000 | 25322-68-3 | | | | | | | | | |
| | Stearyl alcohol EO 5 mol adduct Mw: 888 | | | | | | | | | | |
| | Resorcinol EO adduct Mw: 1136 | 70356-25-1 | | | | | | | | | |
| Cationic surfactant | Polyethylene polypropylene bisaminopropyl ether | 65605-36-9 | 35 | | | | | | | | |
| Organic acid activator | Diglycolic acid | 110-99-6 | | 2 | | | 5 | | | | 4 |
| | Succinic acid | 110-15-6 | | 2 | | | | | 5 | | 3 |
| | Azelaic | 123-99-9 | | | 1 | | | | | 5 | 3 |
| Solvent | 1,2-Butanediol | 584-03-2 | 30 | 20 | 25 | 75 | 40 | 15 | 15 | 15 | 10 |
| | HeDG | 112-59-4 | | | | | | | | | |
| Total | | | 100 | 100 | 100 | 100 | 100 | 100 | 100 | 100 | 100 |
| Solder alloy | | | Sn—40Bi—0.5Cu—0.03Ni | Sn—40Bi—0.5Cu—0.03Ni | Sn—40Bi—0.5Cu—0.03Ni | Sn—40Bi—0.5Cu—0.03Ni | Sn—40Bi—0.5Cu—0.03Ni | Sn—40Bi—0.5Cu—0.03Ni | Sn—40Bi—0.5Cu—0.03Ni | Sn—40Bi—0.5Cu—0.03Ni | Sn—40Bi—0.5Cu—0.03Ni |
| (i) Ni oxide film removing capability | | | ○ | X | X | ○ | ○ | ○ | ○ | ○ | ○ |
| (ii) Wettability | | | ○ | X | X | ○ | ○ | ○ | ○ | ○ | ○ |
| (iii) Washability | | | X | ○ | ○ | X | ○ | ○ | ○ | ○ | ○ |
| (iv) Transferability | | | X | ○ | ○ | X | X | ○ | ○ | ○ | ○ |
| Comprehensive evaluation | | | X | X | X | X | X | ○ | ○ | ○ | ○ |

TABLE 4

| | Material | CAS No. | EX.22 | EX.23 | EX.24 | EX.25 | EX.26 | EX.27 | EX.28 | EX.29 |
|---|---|---|---|---|---|---|---|---|---|---|
| Sulfonic acid activator | Methanesulfonic acid | 75-752 | | | | 2.5 | 5 | 5 | 5 | |
| | p-Toluenesulfonic acid | 104-15-4 | 5 | 5 | 5 | 2.5 | | | | 5 |
| High-molecular-weight nonionic surfactant | Polyethylene glycol A Mw: 3364 | 25322-68-3 | 20 | 20 | 20 | 7 | 20 | 20 | 20 | 20 |
| | Polyethylene glycol B Mw: 1450 | 25322-68-3 | | | | 5 | | | | |
| | Stearyl alcohol EO 20 mol adduct Mw: 1900 | 9005-00-9 | | | | 5 | | | | |
| Low-molecular-weight nonionic surfactant | Polyethylene glycol C Mw: 405 | 25322-68-3 | 55 | 55 | 55 | 25 | 55 | 55 | 55 | 55 |
| | Polyethylene glycol D Mw: 1000 | 25322-68-3 | | | | 10 | | | | |
| | Stearyl alcohol EO 5 mol adduct Mw: 888 | | | | | 10 | | | | |
| | Resorcinol EO adduct Mw: 1136 | 70356-25-1 | | | | 10 | | | | |
| Cationic surfactant | Polyethylene polypropylene bisaminopropyl ether | 65605-36-9 | | | | 2 | | | | |
| Organic acid activator | Diglycolic acid | 110-99-6 | 5 | | | 2 | | | | |
| | Succinic acid | 110-15-6 | | 5 | | 2 | | | 5 | |
| | Azelaic | 123-99-9 | | | 5 | 2 | | | | |
| Solvent | 1,2-Butanediol | 584-03-2 | 15 | 15 | 15 | 10 | 20 | 20 | 20 | 15 |
| | HeDG | 112-59-4 | | | | 5 | | | | |
| Total | | | 100 | 100 | 100 | 100 | 100 | 100 | 100 | 100 |
| Solder alloy | | | Sn—40Bi—0.5Cu—0.03Ni | Sn—40Bi—0.5Cu—0.03Ni | Sn—40Bi—0.5Cu—0.03Ni | Sn—40Bi—0.5Cu—0.03Ni | Sn—1Ag—57Bi | Sn—58Bi | Sn—58Bi—0.5Sb—0.015Ni | Sn—3Ag—0.5Cu |
| (i) Ni oxide film removing capability | | | ○ | ○ | ○ | ○ | ○ | ○ | ○ | ○ |
| (ii) Wettability | | | ○ | ○ | ○ | ○ | ○ | ○ | ○ | ○ |

TABLE 4-continued

| Material | CAS No. | EX.22 | EX.23 | EX.24 | EX.25 | EX.26 | EX.27 | EX.28 | EX.29 |
|---|---|---|---|---|---|---|---|---|---|
| (iii) Washability | | ○ | ○ | ○ | ○ | ○ | ○ | ○ | ○ |
| (iv) Transferability | | ○ | ○ | ○ | ○ | ○ | ○ | ○ | ○ |
| Comprehensive evalution | | ○ | ○ | ○ | ○ | ○ | ○ | ○ | ○ |

As is clear from Tables 1 to 4, the flux compositions of Examples 1 to 29 showed excellent results in all of the results of the items (i) to (iv). The details of this reason are not clear, but the present inventors infer as described below. That is, since the contents of the organic sulfonic acid activator were appropriate, (i) the Ni oxide film removing capability was ensured, and thereby (ii) the wettability was also ensured. In addition, since the contents of the organic sulfonic acid activator and the low-molecular-weight nonionic surfactant were appropriate, the formation of a Sn salt was suppressed, and thereby (iii) the washability was ensured. In addition, since the contents of the low-molecular-weight nonionic surfactant and the high-molecular-weight nonionic surfactant were appropriate, appropriate thixotropy was imparted to the flux compositions, and thereby (iv) the transferability was ensured.

On the other hand, the flux compositions of Comparative Examples 2 and 3 showed poor results in (i) Ni oxide film removing capability and (iv) wettability. As this reason, the present inventors infer that the organic sulfonic acid activator was not contained in these comparative examples.

In addition, the flux compositions of Comparative Examples 1 and 4 showed poor results in (iii) the washability and (iv) the transferability. Regarding this reason, the present inventors infer as described below. In Comparative Example 1, the content of the low-molecular-weight nonionic surfactant was smaller than the content of the organic sulfonic acid activator. Therefore, the merit attributed to the addition of the low-molecular-weight nonionic surfactant was not generated. In Comparative Example 4, the low-molecular-weight nonionic surfactant was not added. Therefore, the suppression of the formation of a Sn salt and the imparting of thixotropy were not sufficient. In addition, in Comparative Example 1, the fact that the content of the cationic surfactant was too large had a significant influence.

In addition, the flux composition of Comparative Example 5 showed poor results in (iv) the transferability. As this reason, the present inventors infer that, in Comparative Example 5, the high-molecular-weight nonionic surfactant was not added, and thus the imparting of thixotropy was not sufficient.

The invention claimed is:
1. A flux containing:
   1 to 10 wt % of an organic sulfonic acid activator;
   10 to 40 wt % of a high-molecular-weight nonionic surfactant that is a nonionic surfactant having a mass-average molecular weight of more than 1200; and
   5 to 75 wt % of a low-molecular-weight nonionic surfactant that is a nonionic surfactant having a mass-average molecular weight of 1200 or less,
   wherein a content of the low-molecular-weight nonionic surfactant is equal to or larger than a content of the organic sulfonic acid activator, and
   wherein the flux contains no cationic surfactant or contains more than 0 wt % and 5 wt % or less of the cationic surfactant.
2. The flux according to claim 1, further containing more than 0 wt % and 10 wt % or less of a co-activator,
   wherein the co-activator contains at least one of an organic acid, an amine, an organophosphorus compound, an organohalogen compound and an amine hydrohalide.
3. The flux according to claim 1, further containing more than 0 wt % and 10 wt % or less of a co-activator,
   wherein the co-activator contains at least one of an organic acid, an organophosphorus compound, an organohalogen compound and an amine hydrohalide.
4. The flux according to claim 1, further containing more than 0 wt % and 60 wt % or less of a solvent.
5. A solder paste containing:
   a flux containing:
      1 to 10 wt % of an organic sulfonic acid activator;
      10 to 40 wt % of a high-molecular-weight nonionic surfactant that is a nonionic surfactant having a mass-average molecular weight of more than 1200; and
      5 to 75 wt % of a low-molecular-weight nonionic surfactant that is a nonionic surfactant having a mass-average molecular weight of 1200 or less,
      wherein a content of the low-molecular-weight nonionic surfactant is equal to or larger than a content of the organic sulfonic acid activator, and
      wherein the flux contains no cationic surfactant or contains more than 0 wt % and 5 wt % or less of the cationic surfactant; and
   a Sn-based solder metal.
6. The solder paste according to claim 5,
   wherein the Sn-based solder metal has a melting point of 210° C. or lower.

* * * * *